(12) United States Patent
Sorida et al.

(10) Patent No.: US 9,453,432 B2
(45) Date of Patent: Sep. 27, 2016

(54) POWER GENERATION SYSTEM (71) Applicant: KAWASAKI JUKOGYO KABUSHIKI KAISHA, Kobe-Shi, Hyogo-Ken (JP)

(72) Inventors: Katsushi Sorida, Sakura (JP); Tatsuo Ino, Tomisato (JP); Yoshihisa Takahashi, Tokyo (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 208 days.

(21) Appl. No.: 14/346,528

(22) PCT Filed: Oct. 3, 2012

(86) PCT No.: PCT/JP2012/075685
§ 371 (c)(1),
(2) Date: Mar. 21, 2014

(87) PCT Pub. No.: WO2013/061743
PCT Pub. Date: May 2, 2013

(65) Prior Publication Data
US 2014/0298809 A1 Oct. 9, 2014

(30) Foreign Application Priority Data

Oct. 28, 2011 (JP) ................................ 2011-237185

(51) Int. Cl.
*F01K 7/00* (2006.01)
*F01K 25/10* (2006.01)
(Continued)

(52) U.S. Cl.
CPC . *F01K 7/00* (2013.01); *F01K 7/18* (2013.01); *F01K 25/10* (2013.01); *F22B 33/14* (2013.01)

(58) Field of Classification Search
CPC ............ F01K 7/00; F01K 25/10; F01K 7/18; F22B 33/14
USPC .......................................... 60/653, 670, 677
See application file for complete search history.

(56) References Cited

U.S. PATENT DOCUMENTS 2,660,236 A * 11/1953 Farnsworth .............. C01D 3/06
159/21
5,386,685 A * 2/1995 Frutschi ................ F01K 23/106
60/39.182

(Continued)

FOREIGN PATENT DOCUMENTS

CN 2695791 Y 4/2005
CN 201 852 073 U 6/2011
(Continued)

OTHER PUBLICATIONS

Office Action issued in Chinese Patent Application No. 201210413084.2 dated Jun. 3, 2014 (with partial translation).
(Continued)

*Primary Examiner* — Hoang Nguyen
(74) *Attorney, Agent, or Firm* — Oliff PLC (57) ABSTRACT

To provide a power generation system that recovers heat from low-temperature exhaust gas of not more than 150° C. and utilizes the heat to increase an amount of generated electric power of a steam turbine, whereby efficiency in thermal use can be improved. A power generation system includes heat exchangers and configured to exchange heat of a heat medium and heat of water, and a vacuum flasher configured to supply steam to a vacuum stage of a steam turbine, wherein heat media are supplied to the heat exchangers and so as to generate a water fluid having a temperature exceeding a water boiling point under vacuum of a vacuum stage, the water fluid is supplied to the vacuum flasher to generate steam under vacuum of the vacuum stage, and the steam is introduced into the vacuum stage of the steam turbine, whereby an amount of generated electric power is increased.

3 Claims, 5 Drawing Sheets

(51) Int. Cl.
*F01K 7/18* (2006.01)
*F22B 33/14* (2006.01)

(56) References Cited

U.S. PATENT DOCUMENTS

| | | | | |
|---|---|---|---|---|
| 5,839,269 A | * | 11/1998 | Frutschi | F01K 23/106 |
| | | | | 60/39.182 |
| 5,935,423 A | * | 8/1999 | Crane | C10G 7/00 |
| | | | | 137/13 |
| 2010/0146972 A1 | | 6/2010 | Sorita et al. | |

FOREIGN PATENT DOCUMENTS

| | | |
|---|---|---|
| CN | 203050805 U | 7/2013 |
| EP | 0 314 028 A1 | 5/1989 |
| JP | A-62-29707 | 2/1987 |
| JP | U-62-180607 | 11/1987 |
| JP | A-1-280604 | 11/1989 |
| JP | A-2004-353571 | 12/2004 |
| JP | A-2008-157183 | 7/2008 |
| JP | A-2011-196191 | 10/2011 |

OTHER PUBLICATIONS

Jun. 5, 2015 Extended Search Report in European Patent Application No. 12844410.6.

International Preliminary Report on Patentability issued in International Patent Application No. PCT/JP2012/075685 dated Apr. 29, 2014.

International Search Report issued in International Application No. PCT/JP2012/075685 on Dec. 25, 2012 (with translation).

* cited by examiner

POWER GENERATION SYSTEM

TECHNICAL FIELD

The present invention relates to a steam turbine power generation system (power generation equipment) capable of increasing an amount of generated electric power, by utilizing a heat source whose temperature is lower than a conventional one.

BACKGROUND ART

In establishments where heat of relatively a lower temperature such as waste heat is generated, for example, in a cement kiln, an iron making factory, a metal refinery, a chemical factory, an incinerator, a geothermal power plant and so on, there is provided a steam turbine power generation system that generates power by driving a steam turbine with a steam, which is recovered or generated by a waste-heat boiler or the like from heat such as an exhaust gas or the like, in order that an energy resource can be effectively used.

Patent Document 1 describes a power generation system that utilizes waste heat of a cement calcination plant.

In the cement calcination plant, for example, a large amount of exhaust gas of 300° C. to 400° C. is discharged from a suspension preheater (hereinafter referred to as just a preheater or PH), and a large amount of exhaust gas of about 250° C. to 300° C. is discharged from an air quenching cooler (hereinafter referred to as just a quenching color or AQC). The exhaust gas from the PH and the exhaust gas from the AQC largely differ in temperature and waste heat quantity, depending on an operation condition of the plant. In particular, a temperature of the exhaust gas from the AQC largely varies in a repeatedly cyclic manner.

In a conventional power generation system that recovers a waste heat of a cement calcination plant, there are provided a PH boiler using an exhaust gas of a PH as a heat medium and an AQC boiler using an exhaust gas of an AQC as a heat medium, for example. High-pressure steam, which is generated by both boilers, is introduced into a high-pressure stage of a steam turbine, and low-pressure steam, which is generated by separating, with a flasher, surplus hot water obtained in a heater unit of the AQC boiler into steam and liquid, is introduced into a low-pressure stage, so as to drive the steam turbine. An exit-gas temperature of the heater unit of the AQC boiler is about 100° C., and an exit-gas temperature of the PH boiler is 200° C. to 250° C.

However, in the cement calcination plant after the AQC boiler has been installed, although there are further heat sources of a lower temperature such as an exhaust gas from a lower-temperature part of the AQC and an exhaust gas whose waste heat has been recovered, it is difficult to generate steam capable of being supplied to a suitable stage of the steam turbine, by low-temperature media from these low-temperature heat sources. Thus, the heat of these exhaust gases are not recovered.

In a sintering cooler in an iron making factory, there is also utilized a power generation system that recovers waste heat of a high-temperature exhaust gas of 250° C. to 450° C. However, waste heat of a lower-temperature exhaust gas of the sintering cooler is not recovered.

As described above, conventionally, since it is difficult to generate steam capable of being supplied to a steam turbine, from a low-temperature heat source of, e.g., not more than 150° C. in a factory, waste heat thereof is not recovered.

However, in recent years, in view of an environmental problem, a cost saving request and, in particular, a request of selecting a safe power generation means based on the Tohoku earthquake, further improved waste heat utilization is desired. Namely, it is now desired that heat of an exhaust gas having a further lower temperature, which is generated in a factory or the like, can be efficiently used.

As a method of obtaining power by recovering heat from a low-temperature heat source, there is a binary cycle power generation system disclosed in Patent Document 2, for example. The binary cycle power generation system is a closed turbine power generation system of a Rankine cycle type which drives a steam turbine to generate power in the following manner. Namely, a medium whose boiling point is lower than that of water such as pentane or trifluoroethanol is used as a working medium. With the use of steam obtained by evaporating the medium with heat from a low-temperature heat source, the steam turbine is driven. Such a binary cycle power generation system can recover heat from steam of a low temperature and hot water of a low temperature, which have not been conventionally utilized.

However, the binary cycle power generation system is a power generation system suited for a low-temperature heat source. Thus, when there is also a high-temperature heat source, a steam turbine for binary cycle which uses an expensive heat medium should be added, in addition to a highly efficient steam turbine system using high-temperature steam. Therefore, the binary cycle power generation system is unsatisfactory in terms of cost effectiveness.

Patent Document 1: JP2008-157183A

Patent Document 2: JP2004-353571A

DISCLOSURE OF THE INVENTION

Accordingly, the object of the present invention is to provide a power generation system capable of highly efficiently utilizing heat from a low-temperature heat source at a lower cost, by utilizing a structure of a conventional steam turbine power generation plant without largely changing the structure.

A power generation system of the present invention is a power generation system for generating power by supplying a steam turbine with high-temperature steam having a pressure not less than an atmospheric pressure, the power generation system further including a vacuum flasher connected to a vacuum stage of the steam turbine, wherein steam is introduced to the vacuum stage of the steam turbine, the steam having been generated by supplying warm water to the vacuum flasher and by flashing the warm water by the vacuum flasher.

The power generation system may further includes a heater, wherein the heater is configured to generate the warm water by heating water water with a heat medium having been supplied from a low-temperature heat source, and to supply the warm water to the vacuum flasher.

A heat exchanger may be used as the heater, and, as a heating-side fluid, a heat medium such as water or gas having a temperature of not more than 150° C. and not less than a normal temperature may be supplied to the heat exchanger, so as to generate the warm water to be supplied to the vacuum flasher.

Since it is sufficient that steam is generated under vacuum not more than an atmospheric pressure, a temperature of the heating-side fluid to be supplied to the heat exchanger may be 150° C. or less.

The power generation system of the present invention generates warm water of not more than 100° C. by exchanging heat of the low-temperature medium from the low-temperature heat source and heat of water as a working medium, supplies the warm water to the vacuum flasher which flashes the warm water under vacuum to generate steam, and supplies the steam to the vacuum stage of the steam turbine, whereby a turbine output is increased. Thus, the low-temperature heat source can be efficiently utilized.

The power generation system of the present invention can be constituted by adding a vacuum flasher and further a heater to a conventional power generation system. As a working medium, an expensive heat medium used in a binary cycle power generation system is not used, but water, which is not expensive but has an excellent heat-medium property, can be used. Thus, a manufacturing cost and an operation cost can be restrained. In particular, when there already exists a power generation system, only a small additional investment is needed, which is economical. When the heat exchanger is located near to the low-temperature heat source, and the vacuum flasher is located near to the steam turbine, waste heat of an exhaust gas or the like can be transmitted with the use of water excellent in transporting heat, and the water is made into steam near to the steam turbine and is supplied thereto. Thus, since thermal energy therebetween can be transported by using a relatively narrow pipe, a cost required for the equipment can be restrained.

When the power generation system of the present invention is applied to a cement plant, there can be used, as a low-temperature medium to be introduced into the heat exchanger, any of an low-temperature exhaust gas that has been generated in a suspension preheater (PH) in a cement calcination plant, heat of the exhaust gas having been recovered by a PH boiler, an low-temperature exhaust gas that has been generated in an air quenching cooler (AQC), heat of the exhaust gas having been recovered by an AQC boiler, and an low-temperature exhaust gas that is discharged from a low-temperature part of the AQC.

According to the power generation system of the present invention, with the use of a steam turbine power generation apparatus using water as a working medium, thermal energy discharged from a low-temperature heat source can be efficiently recovered, as well as heat from a high-temperature heat source can be recovered. Thus, heat can be utilized highly efficiently and economically.

DESCRIPTION OF EMBODIMENTS

A power generation system of the present invention will be described in detail below by using embodiments.

Embodiment 1

Figure 1:
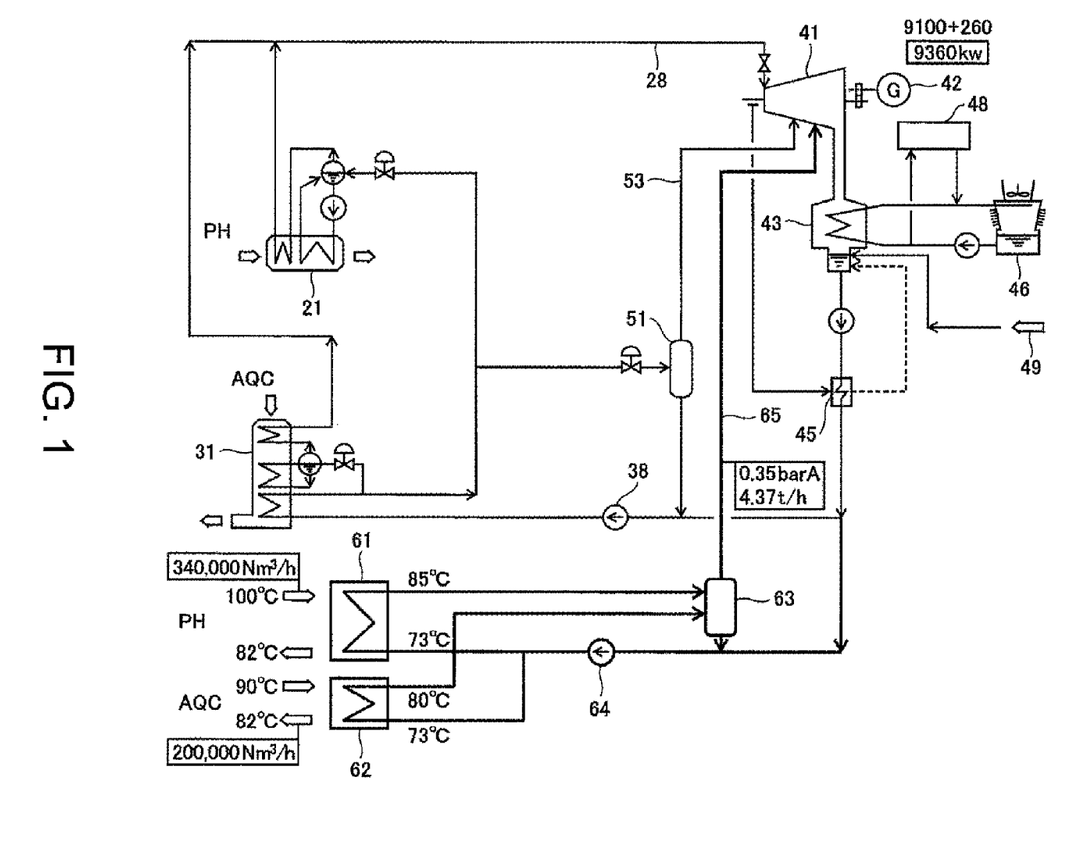
FIG. 1 is a block diagram of a power generation system according to a first embodiment of the present invention.
Figure 2:
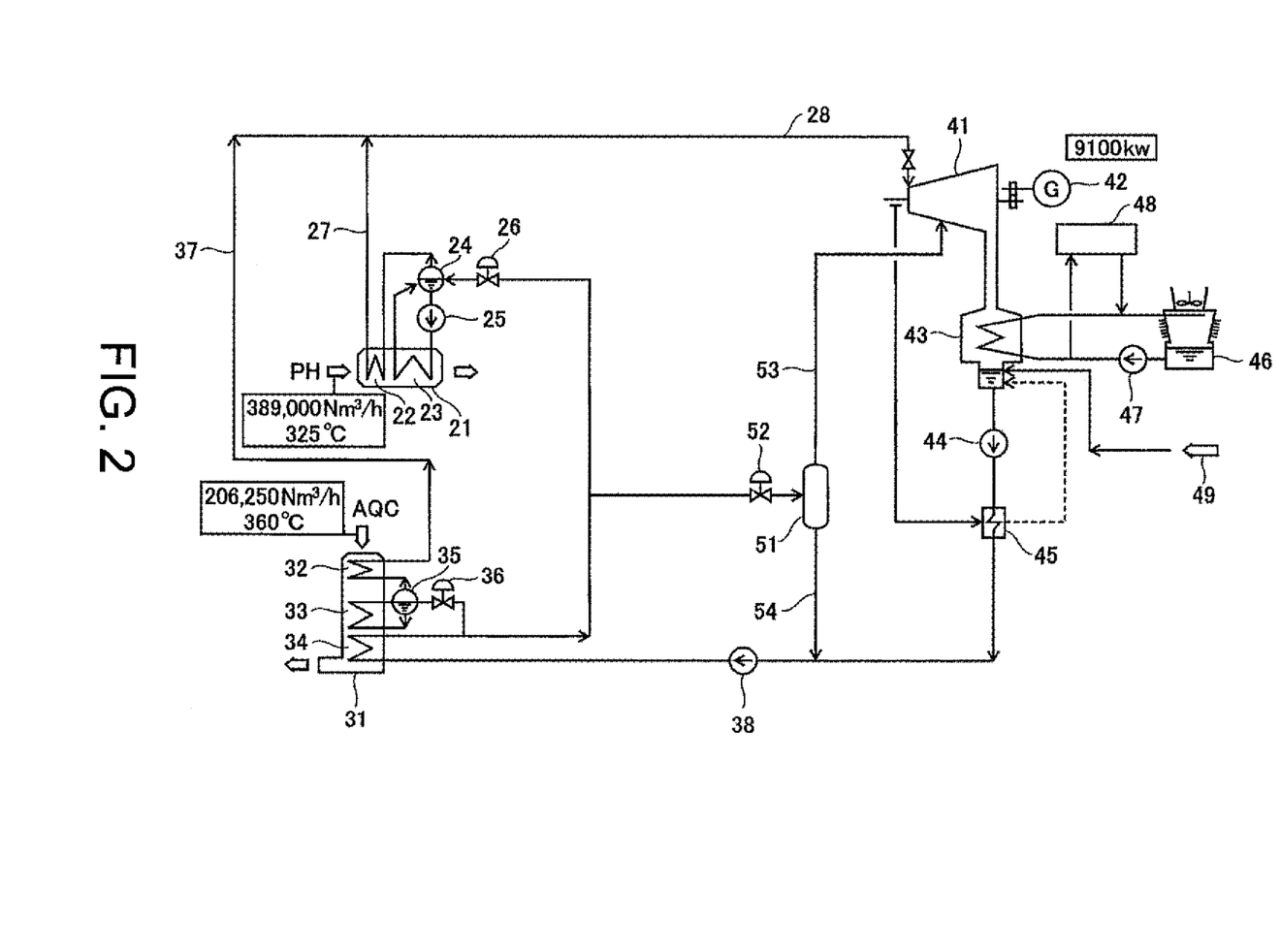
FIG. 2 is a block diagram showing an example of a waste-heat recovery power generation plant to which the embodiment is applied.
Figure 3:
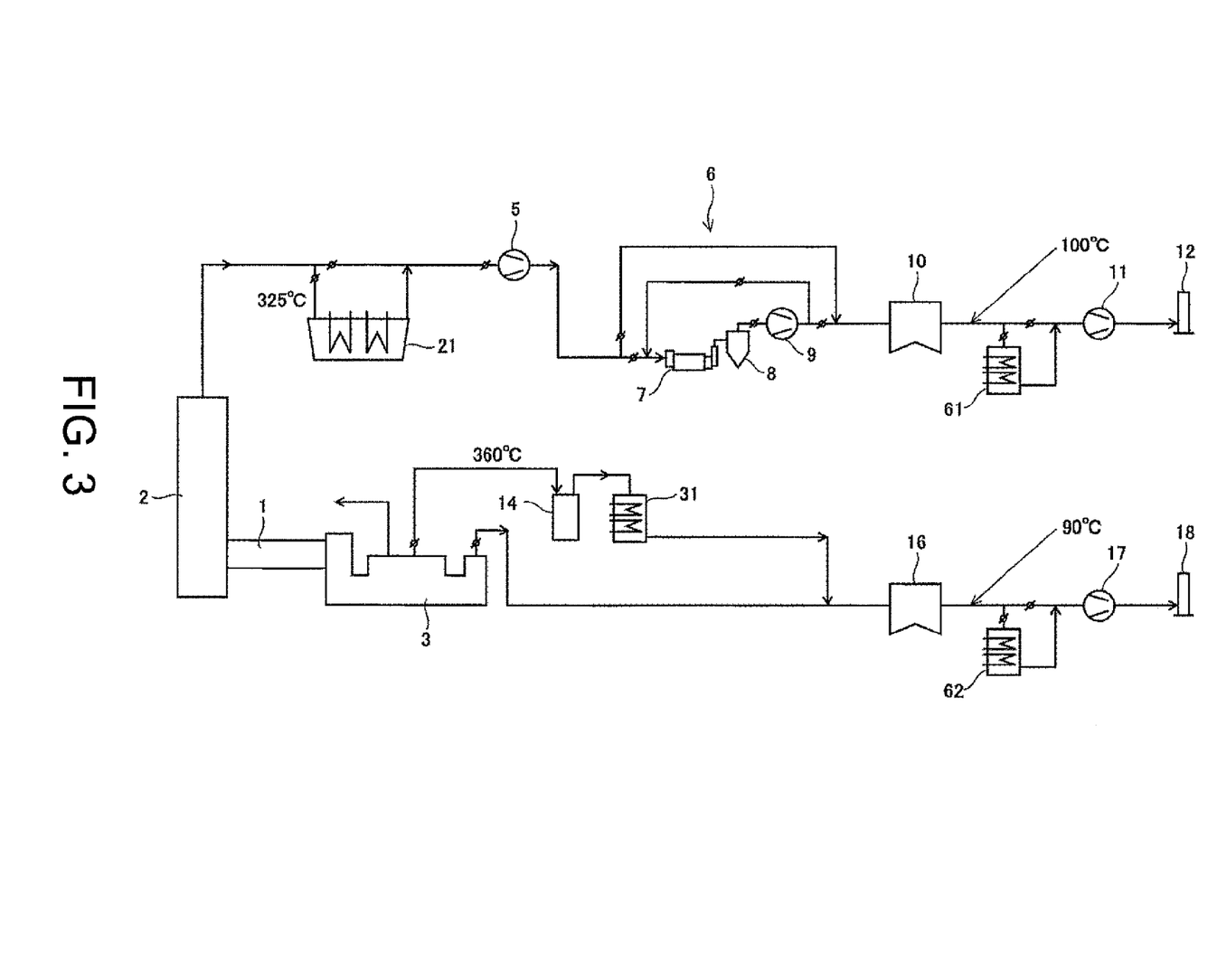
FIG. 3 is a block diagram showing an exhaust-gas treatment equipment of a cement calcination plant to which the embodiment is applied.

FIG. 1 is a block diagram of a power generation system in a first embodiment of the present invention. FIG. 2 is a block diagram showing an example of a waste-heat recovery power generation plant to which the embodiment is applied. FIG. 3 is a block diagram showing an exhaust-gas treatment equipment of a cement calcination plant to which the embodiment is applied. In the drawings, elements having the same function are shown by the same reference number, and description thereof is sometimes omitted.

As shown in FIG. 1, the power generation system in this embodiment is an example in which the power generation system of the present invention is applied to an exhaust-gas treatment equipment of a cement calcination plant shown in FIG. 3.

In the cement calcination plant shown in FIG. 3, an exhaust gas of 300° C. to 400° C. is generated from a preheater (PH) 2 of a kiln 1. The exhaust gas is used for preheating a raw material by a raw material mill 7 in a raw material milling step 6, and after that the exhaust gas is discharged to atmospheric air from a funnel 12 through an electric precipitator (EP) 10. In addition, a tail gas is generated from a quenching cooler (AQC) 3 of the kiln 1 at an average temperature of 250° C. to 300° C. in case there has been no extraction of the tail gas in midstream. On the other hand, in this embodiment, the tail gas generated in the AQC 3 is partly extracted from the high-temperature region of the AQC 3 at a temperature of about 360° C. Heat of the extracted tail gas is recovered by the AQC boiler 31. A remaining tail gas is discharged from the AQC 3 at a temperature of about 110° C. The exhaust gas having been recovered by the AQC boiler 31 is merged with the exhaust gas discharged from the AQC 3. The Merged gases are discharged to atmospheric air from a funnel 18 through an electric precipitator (EP) 16. In FIG. 3, the reference numbers 5, 9, 11 and 17 depict fans, the reference number 8 depicts a cyclone separator, and the reference number 14 depicts a dust collector.

As described above, a large quantity of heat is transported with the exhaust gases and is abandoned from the cement calcination plant. Thus, a waste-heat recovery power generation plant as shown in FIG. 2, for example, has been conventionally provided, so as to recover a large part of waste heat from the exhaust gases of high temperatures.

FIG. 2 shows a conventional waste-heat recovery power generation plant that is applied to an exhaust-gas treatment equipment of a cement calcination plant under a certain condition. The waste-heat recovery power generation plant includes a PH boiler 21 configured to use an exhaust gas of a PH as a heating medium, and an AQC boiler 31 configured to use an exhaust gas from a high-temperature part of an AQC as a heating medium. The waste-heat recovery power generation plant further includes a flasher 51 configured to separate warm water, which has been supplied from the AQC boiler 31, into steam and liquid. High-pressure steam generated in the PH boiler 21 and high-pressure steam generated in the AQC boiler 31 are introduced into a high-pressure stage of a steam turbine 41, and low-pressure steam generated in the flasher 51 is introduced into a low-pressure stage of the steam turbine 41, so as to drive the steam turbine 41, whereby energy of the waste heat is efficiently recovered as electric power with the use of a power generator 42.

The PH boiler 21 is provided with a superheater 22 and an evaporator 23, which are disposed inside the PH boiler 21, and a steam drum 24, a pump 25 and a control valve 26, which are disposed outside the PH boiler 21. An exhaust gas from the PH, which is at a temperature of 325° C. and a flow rate of 389,000 Nm$^3$/h, is supplied as a heating-side fluid to the PH boiler 21. Water of the steam drum 24 is supplied to the evaporator 23 by the pump 25 to become mixed water containing steam. The mixed water is returned to the steam drum 24 and is separated into steam and hot water. The steam of the steam drum 24 becomes superheated steam in the superheater 22, and is supplied to a pipe 27. The control valve 26 controls a flow rate of supplied water such that a water head of the steam drum 24 can be secured. As shown in FIG. 3, after an exhaust gas discharged from the PH boiler 21 has been utilized as a heat source for preheating a raw material in the raw material milling step 6, the exhaust gas is discharged to atmospheric air from the funnel 12 through the electric precipitator 10.

The AQC boiler 31 is provided with a superheater 32, an evaporator 33 and an economizer 34, which are disposed inside the AQC boiler 31, and a steam drum 35 and a control valve 36, which are disposed outside the AQC boiler 31. An exhaust gas at an average temperature of 360° C. at a flow rate of 206,250 Nm$^3$/h is taken out from a high-temperature region of a tail gas generated in the AQC, and the taken-out exhaust gas is supplied as a heating-side fluid to the AQC boiler 31. Warm water having been supplied from a boiler feeding pump 38 to the AQC boiler 31 is heated by the economizer 34 into hot water. A part of the hot water generated in the economizer 34 is supplied to the steam drum 35 through the control valve 36. The hot water is passed through the evaporator 33 and the superheater 32 to become superheated steam. The superheated steam is supplied to a pipe 37. A part of the remaining part of the hot water generated in the economizer 34 is supplied to the PH boiler 21, and the remaining is supplied to the flasher 51.

The superheated steam in the pipe 27 and the superheated steam in the pipe 37 are merged in a steam pipe 28, and are supplied to the high-pressure stage of the steam turbine 41.

The flasher 51 is provided with a control valve 52. In the flasher 51, the hot water supplied from the AQC boiler 31 is flashed into a tank, so that the hot water is separated into steam and liquid. The thus generated steam of a pressure not less than an atmospheric pressure is supplied to the low-pressure stage of the steam turbine 41 through a pipe 53. The thus separated warm water is merged into condensed water of the steam turbine 41 through a pipe 54, and is returned to the AQC boiler 31 by using the boiler feeding pump 38.

A steam turbine generator is mainly composed of the steam turbine 41 and the generator 42.

The steam turbine 41 is driven by the high-pressure steam introduced into the high-pressure stage and the low-pressure steam introduced into the low-pressure stage, so as to generate power by driving the generator 42 whose rotation shaft is connected to a rotation shaft of the steam turbine 41 through a transmission mechanism. Under this condition, power of 9100 kW can be obtained from the generator 42.

A distal end of the steam turbine 41 is connected to a condenser 43. Since the steam of the steam turbine 41 is cooled and condensed in the condenser 43 into condensed water of a low temperature, a pressure in the distal end portion of the steam turbine 41 is reduced to create a vacuum therein. Thus, the last stage of the steam turbine 41 and some stages on the upstream side of the last stage provide a vacuum stage in a vacuum state. The higher a vacuum degree in the distal end portion of the steam turbine 41 is, the higher a turbine output becomes.

Cooling water manufactured in a cooling tower 46 and supplied by a cooling pump 47 is used for cooling the condenser 43. A part of the cooling water is taken out and is used in an auxiliary 48 of the turbine and the generator and so on.

Condensed water generated in the condenser 43 is conveyed to the economizer 34 of the AQC boiler 31 through a ground steam condenser 45, by means of a condenser pump 44.

Heat of the steam for sealing a shaft of the steam turbine 41 is exchanged with heat of the condensed water of the steam turbine 41 by the ground steam condenser 45, so that the steam for sealing a shaft of the steam turbine 41 is condensed into water. The water is introduced to the condenser 43.

Makeup water can be replenished from a makeup tank 49 to the condenser 43.

As shown in FIG. 3, in the cement calcination plant, there is a low-temperature heat source of not more than 150° C. whose heat is difficult to be recovered, in addition to the exhaust gas of relatively a higher temperature, which is discharged from the PH 2 or the high-temperature part of the AQC 3 whose heat has been conventionally recovered efficiently. For example, after heat has been recovered from the exhaust gas of the PH 2 by a conventional method, the gas maintains a temperature of 100° C. before and after it passes the electric precipitator 10. A remaining exhaust gas having been taken out from the high-temperature region of the AQC 3 has an average temperature of about 110° C. An exhaust gas, to which the exhaust gas from the high-temperature part of the AQC has been merged after heat recovery, has a temperature of 90° C. before and after passing through the electric precipitator 16.

The power generation system in this embodiment shown in FIG. 1 is constituted by adding elements configured to recover heat of the aforementioned low-temperature heat sources of not more than 150° C., to the conventional waste-heat recovery power generation plant shown in FIG. 2.

Taking account of the existence of the vacuum stage in the steam turbine, the power generation system of the present invention generates steam corresponding to the vacuum from warm water, and introduces the steam into the vacuum stage so as to assist rotation of the steam turbine. Thus, an output of the generator can be increased without using an expensive heat medium.

As indicated by the thick lines in FIG. 1, the additional elements in this embodiment are a PH heat exchanger 61, an AQC heat exchanger 62, a vacuum flasher 63, a heat exchanger feed water pump 64 and pipes associated therewith.

As shown in FIG. 3, the PH heat exchanger 61 is disposed between the electric precipitator 10 and the funnel 12 in the exhaust-gas treatment equipment of the suspension preheater (PH) 2. The PH heat exchanger 61 is configured to receive a supply of an exhaust gas of 100° C. In addition, the PH heat exchanger 61 is configured to heat a part of condensed water of the steam turbine 41 so as to recover heat of the exhaust gas of the PH 2.

The AQC heat exchanger 62 is disposed between the electric precipitator 16 and the funnel 18 in the exhaust-gas treatment equipment of the air quenching cooler (AQC) 3. The AQC heat exchanger 62 is configured to receive a supply of an exhaust gas of 90° C. In addition, the AQC heat exchanger 62 is configured to heat a part of condensed water of the steam turbine 41 so as to recover heat of the exhaust gas of the AQC 3.

Warm water obtained in the PH heat exchanger 61 and the AQC heat exchanger 62 is transported to the vacuum flasher 63. The warm water is flashed herein at a low vacuum into steam. The steam is introduced into the vacuum stage of the steam turbine 41 through the steam pipe 65 to increase an output of the generator 42. Then the steam is condensed by the condenser 43 into water. After the water passes through the ground steam condenser 45, a part of the water is returned to a heat exchange circuit of the PH heat exchanger 61 and the AQC heat exchanger 62, the remaining is supplied to the AQC boiler 31.

The heat exchanger feed water pump 64 has a function for circulating warm water having been separated by the vacuum flasher 63 and warm water having been returned through the ground steam condenser 45 in the heat exchange circuit.

Steam under vacuum, which is generated by the vacuum flasher 63, cannot have a pressure that is largely different from a vacuum atmosphere in the introduction stage of the steam turbine 41. Thus, the steam pipe 65 through which steam is transported is required to have a large pipe diameter and a short pipe length as much as possible. In addition, since liquid is more excellent than steam as a medium that transports energy, even when a warm-water pipe connecting the PH heat exchanger 61 and the vacuum flasher 63, and a warm-water pipe connecting the AQC heat exchanger 62 and the vacuum flasher 63, both of which have a long length, improved efficiency can be obtained due to the reduced length of the steam pipe 65. Thus, the vacuum flasher 63 is preferably located near to the steam turbine 41.

This embodiment is examined under the same conditions as those shown in FIG. 2. The PH heat exchanger 61 takes an exhaust gas of 100° C. at 340,000 Nm³/h from an exhaust gas on the downstream side of the electric precipitator 10, cools the exhaust gas down to 82° C. by using heat exchange, and then discharges the exhaust gas from the funnel 12. On the other hand, the PH heat exchanger 61 heats warm water of 73° C. supplied from the heat exchanger feed water pump 64 up to 85° C., and supplies the water of 85° C. to the vacuum flasher 63.

Meanwhile, the AQC heat exchanger 62 takes an exhaust gas of 90° C. at 200,000 Nm³/h from an exhaust gas on the downstream side of the electric precipitator 16, cools the exhaust gas down to 82° C. by using heat exchange, and then discharges the exhaust gas from the funnel 18. On the other hand, the AQC heat exchanger 62 can heat warm water of 73° C. up to 80° C. and supply the water of 80° C. to the vacuum flasher 63.

The vacuum flasher 63 can generate vacuum steam of 0.35 barA at 4.37 t/h from the warm water, and can introduce the vacuum steam into the vacuum stage of the steam turbine 41 through the steam pipe 65.

In this manner, with the use of the power generation system in this embodiment, thermal energy is recovered from a low-temperature heat source, which has not been conventionally used, to increase the power by 260 kW, namely, an output of the waste-heat recovery power generation plant can be 9360 kW.

Although the power generation system in this embodiment utilizes the structure of a conventionally-used steam turbine generator using steam as it is, without using an expensive heat medium having a low boiling point, such as pentane or trifluoroethanol, the power generation system in this embodiment can generate low-pressure steam from a low-temperature heat source with the use of a vacuum flasher, introduce the low-pressure steam into a suitable vacuum stage to increase an amount of generated electric power, so as to recover thermal energy. Thus, both an equipment cost and an operation cost can be saved, whereby a waste-heat recovery power generation of an excellent cost effectiveness can be achieved.

When a waste-heat recovery steam turbine power generation apparatus has been already installed, heat can be recovered from a heat source of a further lower temperature, by slightly modifying the apparatus.

Embodiment 2

Figure 4:
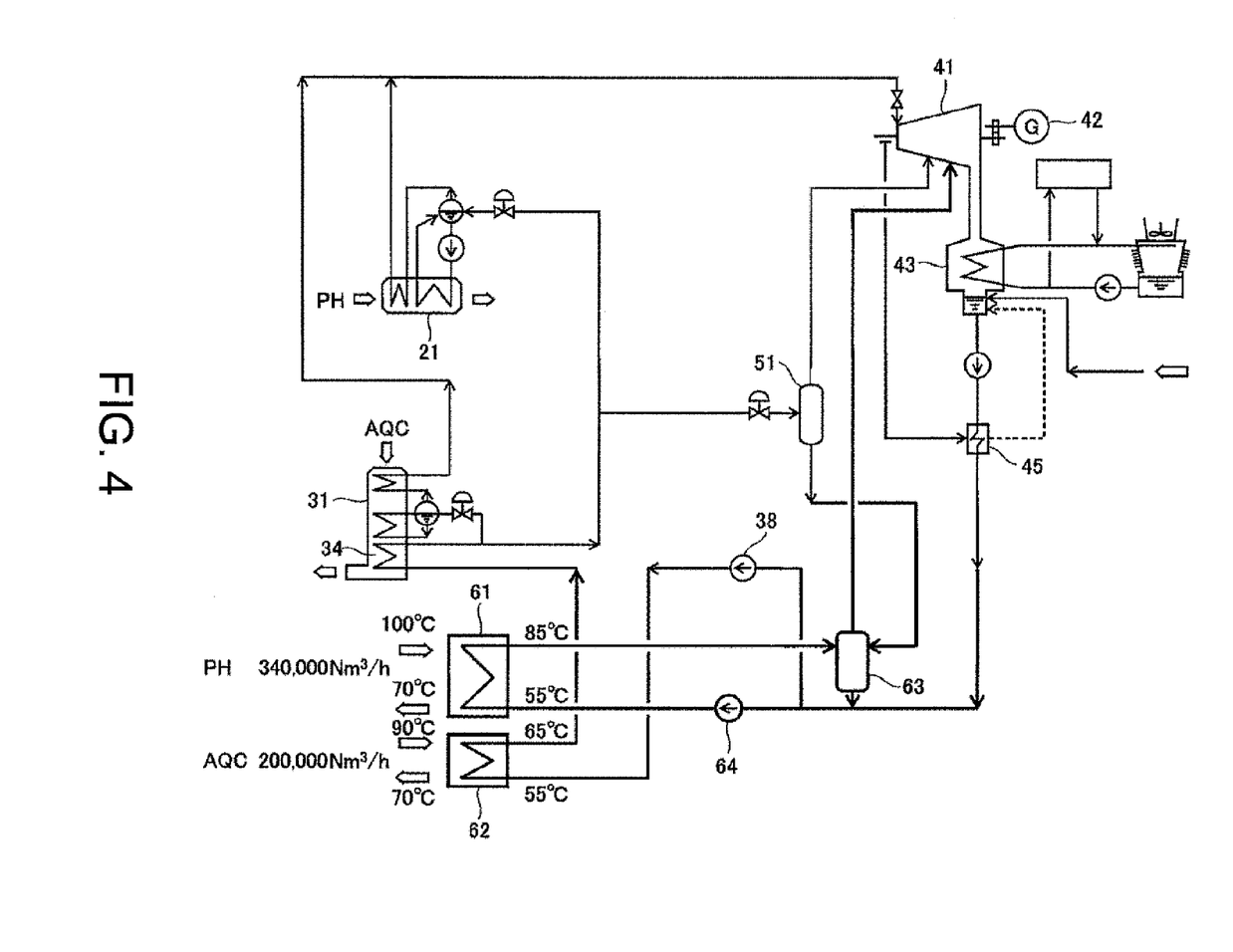
FIG. 4 is a block diagram of a power generation system according to another embodiment of the present invention.

FIG. 4 is a block diagram of a power generation system according to a second embodiment of the present invention. The parts indicated by the thick lines in FIG. 4 are different from those of the conventional waste-heat recovery power generation plant shown in FIG. 2.

In this embodiment, although the same constituent devices as those in the first embodiment are used, pipes connecting the devices are different from the first embodiment. Namely, when the power generation system in this embodiment is compared with that of the first embodiment, the relationship between the PH heat exchanger 61 configured to recover heat from the low-temperature heat source of the PH and the vacuum flasher 63 is unchanged, but a pipe relating to the AQC heat exchanger 62 configured to recover heat from the low-temperature heat source of the AQC and a pipe relating to the vacuum flasher 63 are differed from the first embodiment. Thus, the differences are mainly described herebelow in detail.

In the power generation system in this embodiment, as shown in FIG. 4, all the amount of condensed water, which is supplied to the economizer 34 of the AQC boiler 31 configured to recover heat of a high-temperature heat source in the first embodiment, is supplied through the AQC heat exchanger 62, and water separated by the flasher 51, which is configured to generate low-pressure steam from hot water supplied from the economizer 34, is supplied to the vacuum flasher 63. That is to say, all the amount of condensed water of the steam turbine 41 is supplied to the PH heat exchanger 61 and the AQC heat exchanger 62. The hot water generated by heating condensed water by the AQC heat exchanger 62 is supplied to the economizer 34 of the AQC boiler 3, not to the vacuum flasher 63. Water separated by the flasher 51 is supplied to the vacuum flasher 63 rather than returned directly to the economizer 34. Water separated by the vacuum flasher 63 is merged with condensed water of a low temperature, which is generated by the condenser 43, and is then distributed to the PH heat exchanger 61 and the AQC heat exchanger 62.

According to the structure of this embodiment, since a temperature of the water medium to be supplied to the PH heat exchanger 61 and the AQC heat exchanger 62 is lowered, which makes larger a difference between a temperature of the heat medium at the inlet of each heat exchanger and a temperature of the heat medium at the outlet of each heat exchanger, heat recovery efficiency from the low-temperature heat source can be enhanced. Namely, under the condition of the first embodiment, the temperature of water at the inlets of the heat exchangers 61 and 62 is 73° C. On the other hand, in this embodiment, the temperature of water at the inlets is 55° C. under the same condition. Thus, an output of the generator 42 is increased.

In the above first and second embodiments, the PH boiler and the AQC boiler recover heat of exhaust gases from the PH and the AQC to generate steam and hot water, and the steam thus generated is supplied to the steam turbine. However, as long as the PH boiler and the AQC boiler recover heat of exhaust gases from the PH and the AQC and use these heats for heating water, substances generated by the PH boiler and the AQC boiler are not limited to steam and hot water. For example, the PH boiler and the AQC boiler may generate only hot water by recovering heat of exhaust gases from the PH and the AQC.

Embodiment 3

Figure 5:
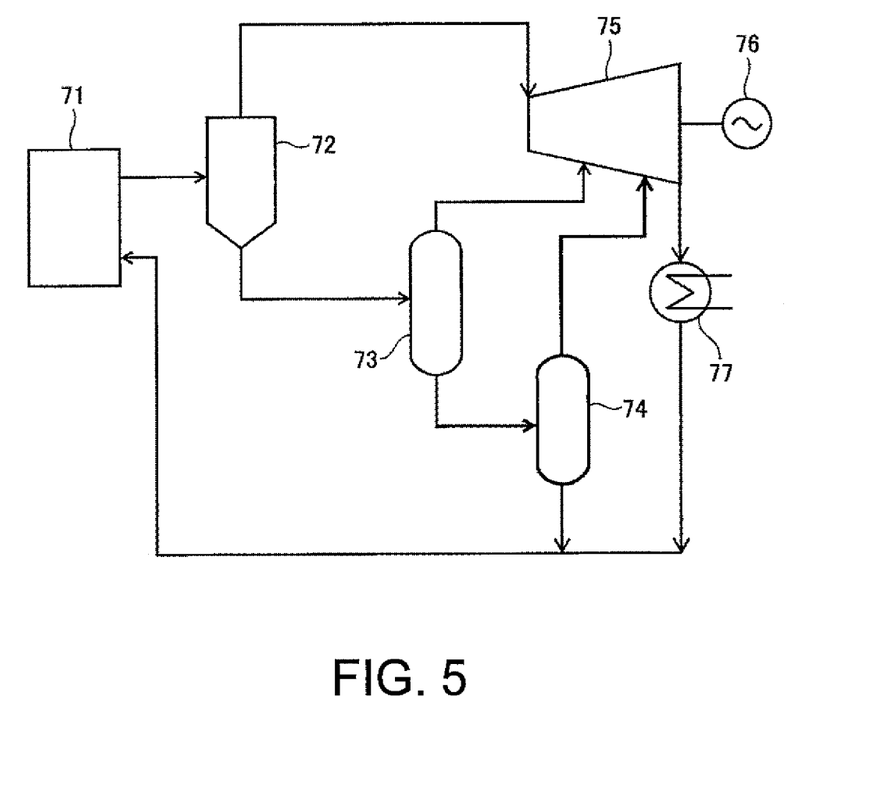
FIG. 5 is a block diagram of a power generation system according to still another embodiment of the present invention.

FIG. 5 is a block diagram of a power generation system according to a third embodiment of the present invention.

In this embodiment, by adding a vacuum flasher to a conventional power generation system, heat is recovered from a low-temperature heat source in a system, which has not been conventionally utilized, whereby efficiency can be improved.

In the power generation system in this embodiment, hot water and steam are generated by a heat source 71 such as a boiler or the like, and the hot water and steam are supplied to a steam-liquid separator 72. High-pressure steam generated by the steam-liquid separator 72 is introduced into a high-pressure stage of a steam turbine 75. Water separated from the steam by the steam-liquid separator 72 is supplied to a flasher 73 and is flashed by the flasher 73 to generate low-pressure steam and warm water. The low-pressure steam is introduced into a low-pressure stage of the steam turbine 75.

The steam turbine 75 drives a generator 76 to generate power. The last stage of the steam turbine 75 is connected to to a condenser 77, and steam therein is cooled by cooling water to be condensed, so that a pressure of the steam is reduced to vacuum.

The condensed water condensed by the condenser 77 is sent to the heat source 71 by a condenser pump to become hot water. The hot water is used again as a working medium of the steam turbine 75.

Since warm water generated by the flasher 73 has a lower temperature, it is conventionally considered that heat thereof is difficult to be recovered. Thus, the warm water is conventionally circulated as a working medium as it is and is again heated by the heat source 71 such as a boiler or the like. However, in this embodiment, the warm water generated by the flasher 73 is supplied to a vacuum flasher 74 configured to flash water under vacuum.

The warm water separated by the vacuum flasher 74 is mixed with condensed water flowing back from the condenser 77 of the steam turbine 75, and is again heated as a working medium by the heat source 71 so as to be used.

A steam pipe of the vacuum flasher 74 is connected to the vacuum stage of the steam turbine 75, so that vacuum steam generated by the vacuum flasher 74 is supplied to the vacuum stage, whereby an output of the generator 76 is increased.

In the power generation system in this embodiment, taking account that a boiling point is lower than 100° C. under a vacuum condition not more than an atmospheric pressure, the vacuum flasher 74 is provided to utilize a low-temperature heat source in a target facility, whereby power generation ability can be increased.

The heat source 71 in this embodiment may either be a heat source itself which exists outside the power generation system or be a heater or a heat exchanger to which heat is given by a heat medium supplied from an external heat source so as to generate hot water. Alternatively, the heat source 71 may be a hot-water source existing below ground, for example.

In the power generation system of the present invention, by taking advantage of a vacuum stage of a steam turbine, steam of a low temperature generated by a vacuum flasher is introduced into the vacuum stage of the steam turbine, so that an amount of generated electric power is increased. Thus, it is possible to recover heat from low-temperature waste heat of various plants and from a low-temperature heat source in the natural world, which have not been conventionally fully utilized.

In the above embodiments, the present invention is applied to a suspension preheater and an air quenching cooler of a cement calcination plant, and there is mainly described the case in which heat is recovered from exhaust gases of relatively a lower temperature having passed through electric precipitators of an exhaust-gas treatment apparatus. However, it goes without saying that the present invention is not limited thereto. For example, heat can be directly recovered from an exhaust gas discharged from a low-temperature part of the air quenching cooler. Alternatively, depending on circumstances, the present invention may be applied to either one of the suspension preheater or the air quenching cooler.

Moreover, the same technical idea can be also applied to a case in which heat is recovered from a waste heat source of a further lower temperature in another plant such as an incinerator and a sintering cooler of an iron making factory. Further, this technical idea can be also applied to a geothermal power plant, in order to utilize a low-temperature heat source that has been conventionally difficult to use.

INDUSTRIAL APPLICABILITY

The power generation system of the present invention can recover heat from a heat source of a lower temperature, which has been conventionally difficult to use, so as to generate power, in various plants or in the natural world.

The invention claimed is:

1. A power generation system for generating power by supplying a steam turbine with high-temperature steam having a pressure not less than an atmospheric pressure, the power generation system further comprising
a vacuum flasher connected to a vacuum stage of the steam turbine, and
a heater,
wherein:
the heater is configured to heat water with a heat medium supplied from a low-temperature heat source so as to generate warm water to be supplied to the vacuum flasher;
steam is introduced to the vacuum stage of the steam turbine, the steam having been generated by supplying the warm water to the vacuum flasher and by flashing the warm water by the vacuum flasher;
the power generation system further comprises a PH boiler configured to generate high-pressure steam by utilizing an exhaust gas generated in a suspension preheater (PH) in a cement calcination plant, and an AQC boiler configured to generate high-pressure steam by utilizing an exhaust gas generated in an air quenching cooler (AQC) in the cement calcination plant;
the steam turbine further comprises a high-pressure stage to which the high-pressure steam generated by the PH boiler and the high-pressure steam generated by the AQC boiler are supplied; and
the heater includes a PH heat exchanger configured to use, as a heating-side fluid, an exhaust gas whose heat has been recovered by the PH boiler so as to generate the warm water to be supplied to the vacuum flasher, and an AQC heat exchanger configured to use, as a heating-side fluid, an exhaust gas whose heat has been recovered by the AQC boiler so as to generate the warm water to be supplied to the vacuum flasher.

2. The power generation system according to claim 1, wherein
a pipe connecting the vacuum flasher and the steam turbine is shorter than a pipe connecting the PH heat exchanger and the vacuum flasher, and a pipe connecting the AQC heat exchanger and the vacuum flasher.

3. The power generation system according to claim 1, wherein
at least a part of hot water generated by the AQC boiler is supplied to the PH boiler.

* * * * *